(12) United States Patent
Vauchel et al.

(10) Patent No.: US 8,231,332 B2
(45) Date of Patent: Jul. 31, 2012

(54) AIR INLET SHROUD STRUCTURE

(75) Inventors: Guy Bernard Vauchel, Le Havre (FR);
Christophe Thorel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 758 days.

(21) Appl. No.: 12/161,189

(22) PCT Filed: Feb. 27, 2007

(86) PCT No.: PCT/FR2007/000344
§ 371 (c)(1),
(2), (4) Date: Jul. 17, 2008

(87) PCT Pub. No.: WO2007/110491
PCT Pub. Date: Oct. 4, 2007

(65) Prior Publication Data
US 2010/0232932 A1    Sep. 16, 2010

(30) Foreign Application Priority Data
Mar. 24, 2006   (FR) ...................................... 06 02549

(51) Int. Cl.
*F01D 25/04* (2006.01)
(52) U.S. Cl. ......... 415/119; 415/9; 415/196; 415/213.1; 415/215.1; 60/226.1; 60/796; 60/797; 60/798; 244/53 R; 244/54

(58) Field of Classification Search ............. 415/119, 415/9, 196, 213.1–215.1; 60/226.1, 796–798; 244/53 R, 54
See application file for complete search history.

(56) References Cited

U.S. PATENT DOCUMENTS

| 3,890,060 A | 6/1975 | Lipstein |
| 4,534,167 A | 8/1985 | Chee |
| 2005/0252195 A1 * | 11/2005 | Porte et al. .................. 60/226.1 |

FOREIGN PATENT DOCUMENTS

| EP | 1084951 A2 | 3/2001 |
| GB | 1543312 | 4/1979 |
| GB | 2065766 A | 7/1981 |

* cited by examiner

*Primary Examiner* — Ajay K Arora
(74) *Attorney, Agent, or Firm* — Porzio, Bromberg & Newman, P.C.

(57) ABSTRACT

The present invention relates to a nacelle for a turbojet, comprising an air inlet structure capable of channelling a flow of air to a turbojet fan and a middle structure (5) comprising a casing (9) designed to encircle said fan, with the air inlet structure attached to it, said structure having a peripheral inside surface at least partly equipped with a sound-attenuating structure (13) extending without geometrical interruption around at least part of the casing, said structure being characterized in that a gap (14) is provided between the sound-attenuating structure and the casing.

11 Claims, 3 Drawing Sheets

AIR INLET SHROUD STRUCTURE

The present invention relates to a nacelle for a turbojet comprising an air intake structure capable of channeling a flow of air toward a fan of the turbojet and a middle structure comprising a casing designed to surround said fan and to which the air intake structure is attached, the latter having an inner peripheral surface at least partially fitted with a sound attenuation structure extending with no geometric break over at least a portion of the casing.

An aircraft is propelled by one or more propulsion assemblies comprising a turbojet housed in a tubular nacelle. Each propulsion assembly is attached to the aircraft by a pylon usually situated beneath the wing or on the fuselage.

A nacelle usually has a structure comprising an air intake upstream of the engine, a mid-section designed to surround a fan of the turbojet, a downstream section housing thrust reversal means and designed to surround the combustion chamber of the turbojet, and is usually terminated by an exhaust nozzle whose outlet is situated downstream of the turbojet.

The air intake comprises, on the one hand, an intake lip suitable for allowing the optimal capture toward the turbojet of the air necessary for supplying the fan and the internal compressors of the turbojet and, on the other hand, a downstream structure to which the lip is fitted and which is designed to appropriately channel the air toward the blades of the fan. The assembly is attached upstream of a casing of the fan belonging to the upstream section of the nacelle.

Document U.S. Pat. No. 3,890,060 describes a nacelle having a sound attenuation structure extending from the downstream structure of the air intake to downstream of the nacelle with no geometric break.

Document U.S. Pat. No. 4,534,167 describes a system of attachment between the air intake structure and the casing of the middle structure making it possible to preserve the continuity of the sound attenuation structure.

However, it has been noted that, when it is desired to install a sound attenuation structure extending from the downstream structure of the air intake structure to the casing, the assembly thus attached becomes hyperstatic between the flange for attachment of the sound attenuation structure of the downstream air intake structure and the flange of attachment of the casing.

The object of the present invention is to remedy the disadvantages mentioned above and for this reason consists in a nacelle for a turbojet comprising an air intake structure capable of channeling a flow of air toward a fan of the turbojet and a middle structure comprising a casing designed to surround said fan and to which the air intake structure is attached, the latter having an inner peripheral surface at least partially fitted with a sound attenuation structure extending with no geometric break over at least a portion of the casing, characterized in that a space is arranged between the sound attenuation structure and the casing.

Therefore, by providing a space between the casing and the sound attenuation structure, the latter is no longer directly connected to the casing, thereby reducing the degree of hyperstaticity.

However, the portion of the sound attenuation structure extending at the casing may be subjected in flight to more or less considerable vibrations depending on the length of the sound attenuation structure protruding beyond the casing, these vibrations being transmitted to the whole nacelle and notably to the rest of the sound attenuation structure, thereby creating more or less considerable deformations which, in their turn, cause aerodynamic and acoustic disruptions due to the break of continuity of the aerodynamic lines of the sound attenuation structure. The following enhancements make it possible to remedy these additional disadvantages.

Advantageously, the sound attenuation structure comprises at least one structural reinforcement means.

Preferably, the structural reinforcement means comprise a sheath, fitted or incorporated into the sound attenuation structure.

Again preferably, the sheath has, at the casing, a thickness that decreases in the direction of the fan. This inclined shape of the sheath makes it possible to provide a conical structure at the casing, this shape being reflected by complementarity onto the casing itself, which then ensures a direction of travel of the forces close to an alignment with the rest of the casing.

Advantageously, the sound attenuation structure is associated, at the casing, with at least one vibration-damping means.

Preferably, the damping means comprise an abutment system mounted on the casing and capable of preventing the sound attenuation structure moving nearer.

Advantageously, the damping means comprise at least one elastic member mounted against the sound attenuation structure. It could, for example, be an elastic strip pressing, on the one hand, on the sound attenuation structure and, on the other hand, on the casing, or else be a spring.

Preferably, the damping means are capable of coming into contact with the sound attenuation structure by means of at least one flexible stop.

Additionally, the sound attenuation structure has a downstream end capable of interacting with at least one complementary retention means fixedly attached to the casing.

Advantageously, the complementary retention means comprises at least one post capable of interacting with a corresponding housing fitted or arranged in the downstream end of the sound attenuation structure.

Again advantageously, the casing has at least one binding strip capable of supporting the sound attenuation structure at its downstream end.

The implementation of the invention will be better understood with the aid of the detailed description that is given below with respect to the appended drawing in which.

Figure 1:
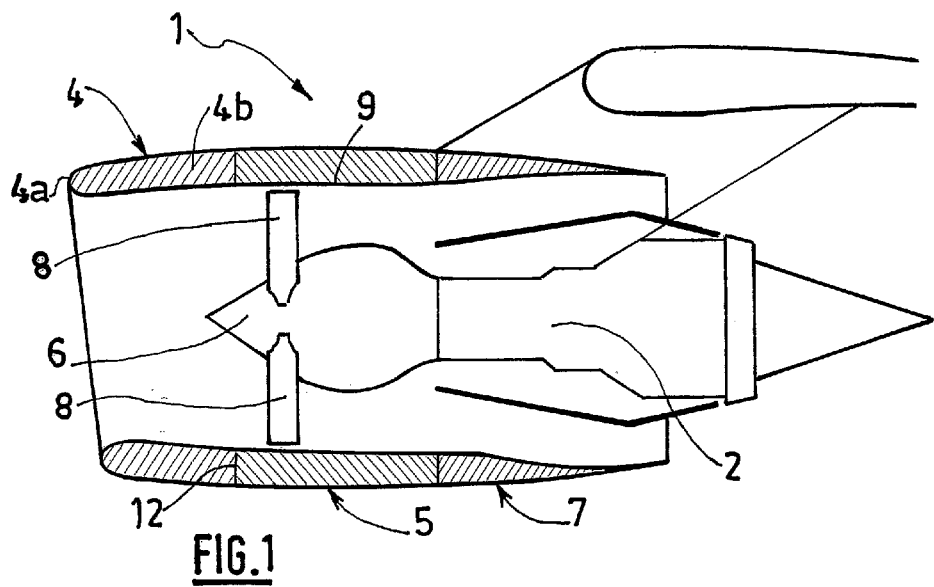
FIG. 1 is a schematic representation of the general structure of a turbojet nacelle according to the invention.

A nacelle 1 according to the invention as represented in FIG. 1 constitutes a tubular housing for a turbojet 2 for which it serves to channel the air flows that it generates by defining internal and external aerodynamic lines necessary to obtain optimal performance. It also houses various components necessary to the operation of the turbojet 2 and ancillary systems such as a thrust reverser.

More precisely, the nacelle 1 has a structure comprising a front section forming an air intake 4, a middle section 5 surrounding a fan 6 of the turbojet 2, and a rear section 7 surrounding the turbojet 2 and housing a thrust reverser system (not visible).

The air intake 4 is divided into two portions, namely, on the one hand, an intake lip 4a suitable for allowing the optimal capture to the turbojet 2 of the air necessary to supply the fan 6 and compressors inside the turbojet 2, and, on the other hand, a downstream structure 4b to which the lip 4a is fitted and which is designed to appropriately channel the air toward the blades 8 of the fan 6. The assembly is attached upstream of a casing 9 of the fan 6 belonging to the middle section 5 of the nacelle 1 by means of attachment flanges 10, 11 respectively fixedly attached to the downstream structure 4b and the casing 9 and forming a join 12.

The downstream structure 4b is fitted, on the inside, with a sound attenuation structure 13 extending beyond the join 12 at least partially inside the casing 9.

The casing 9 is designed so as to arrange a space 14 between said casing 9 and the sound attenuation structure 13, the continuity of the aerodynamic line inside the nacelle 1 being achieved at one end 15 of the sound attenuation structure that is in contact with the casing 9 just in front of the blade 8.

Figure 2:
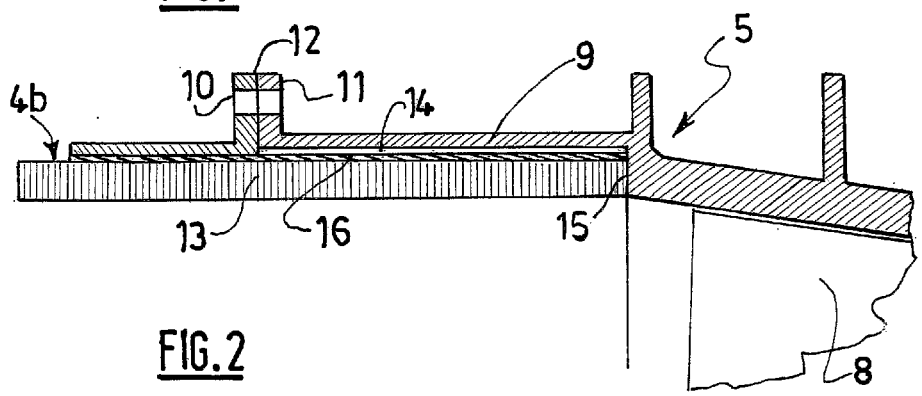
FIGS. 2 to 9 are partial schematic representations of the join between an air intake structure and a casing of the nacelle of FIG. 1.
Figure 3:
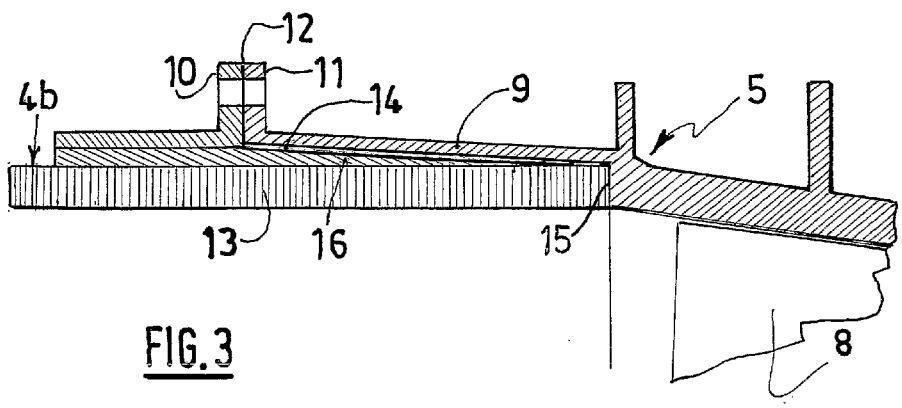

FIGS. 2 and 3 show an enhancement of this arrangement according to which the sound attenuation structure comprises structural reinforcement means. Specifically, in flight, the portion of the sound attenuation structure 13 extending at the casing 9 is subjected to more or less considerable vibrations which in their turn create aerodynamic and acoustic disruptions. As represented in FIG. 2, the sound attenuation structure 13 comprises a sheath 16, fitted or incorporated into the sound attenuation structure 13. Advantageously, as shown in FIG. 3, this sheath 16 has, for the portion of the sound attenuation structure 13 extending inside the casing 9, a thickness that decreases in the direction of the fan 6 thereby conferring a conical shape. Consequently, the casing 9 is suitable for reflecting this shape, then conferring on the upstream portion of the casing a direction of travel of force close to the alignment with the rest of the casing 9.

As a variant, or additionally, the casing 9 is fitted with at least one means for attenuating the vibrations of the sound attenuation structure 13. Different embodiments are shown in FIGS. 4 to 7.

Figure 4:
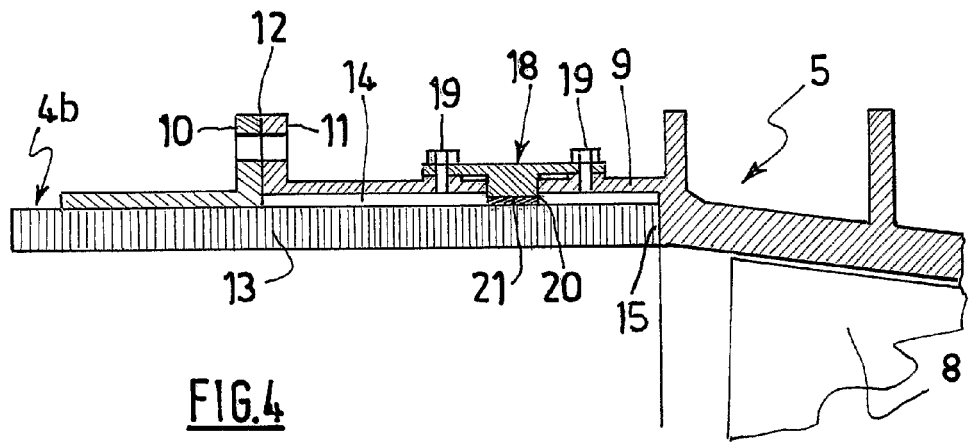

As shown in FIG. 4, the casing 9 is fitted with an abutment means 18 secured to the casing 9 by attachment means 19. The abutment means 18 has a head 20 passing through the casing 9 and terminated by a flexible stop 21 in contact with the sound attenuation structure 13.

Figure 5:
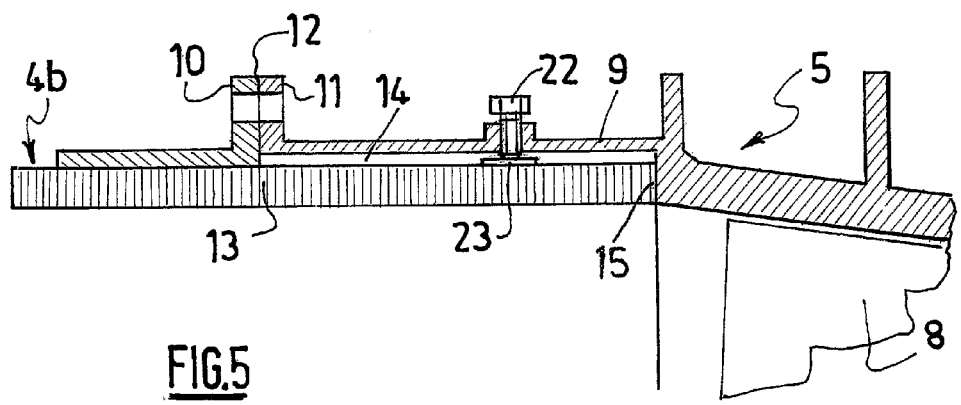

As shown in FIG. 5, the casing 9 is fitted with a vibration-absorption system 22 in rigid contact with the sound attenuation structure 13 by means of a point-like stop 23. The vibration-absorption system 22 may be adjusted to the desired pressure. The point-like stop 23 may if necessary be flexible.

Figure 6:
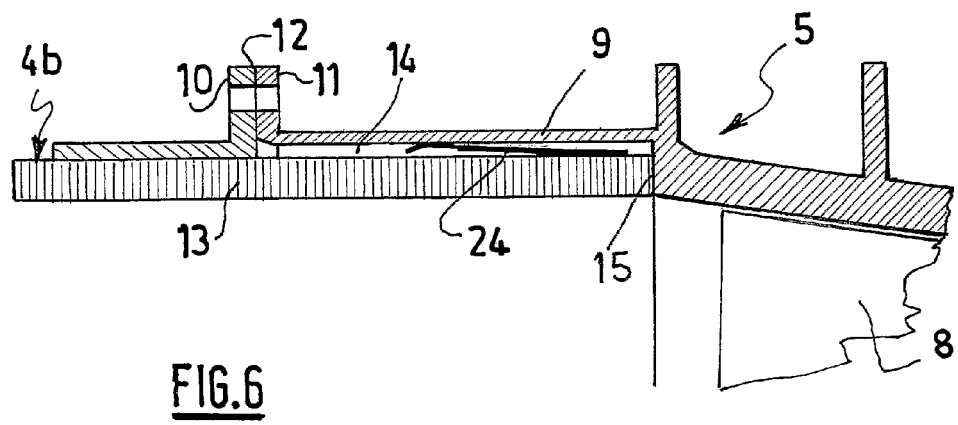

As shown in FIG. 6, the casing 9 is fitted with an elastic strip 24 that is situated in the space 14 and presses, on the one hand, on the casing 9, and, on the other hand, on the sound attenuation structure 13 whose vibrations it absorbs.

Figure 7:
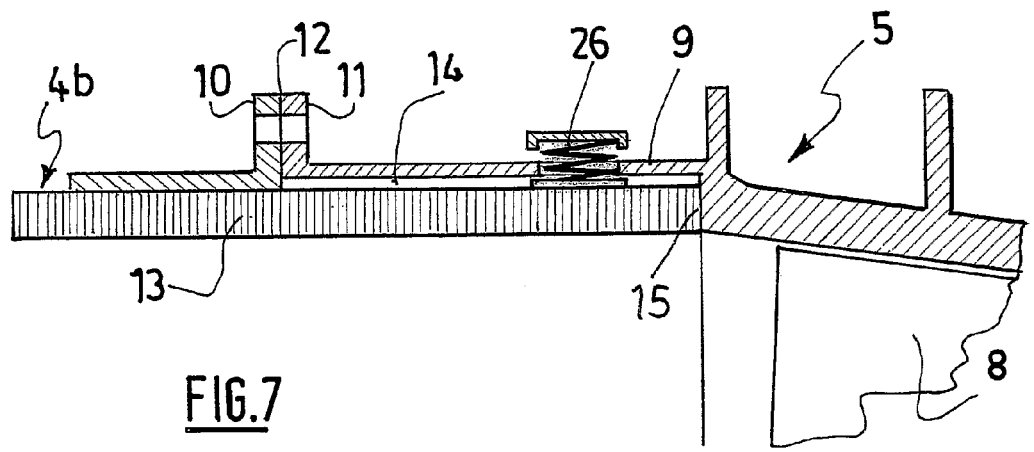

As shown in FIG. 7, the elastic strip 24 is replaced by a spring 26.

Evidently, the spring 26 and the elastic strip 24 have a stiffness suited to the vibrations to be absorbed.

Figure 8:
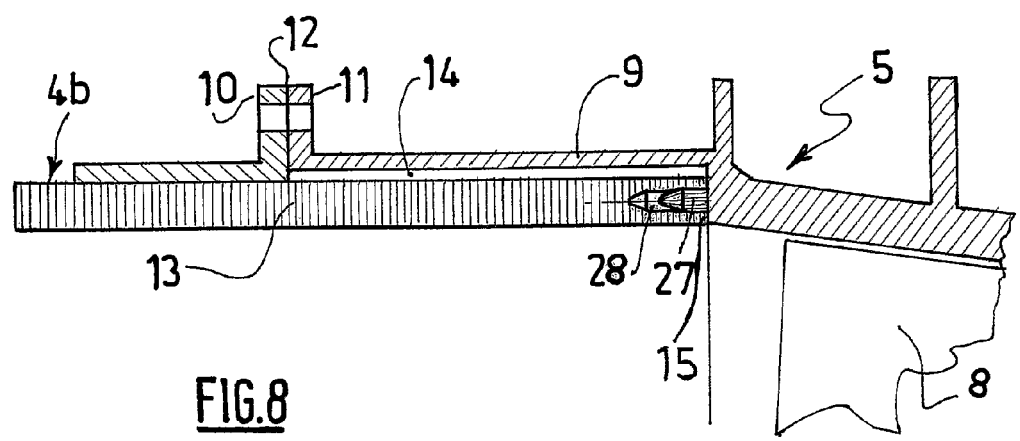
Figure 9:
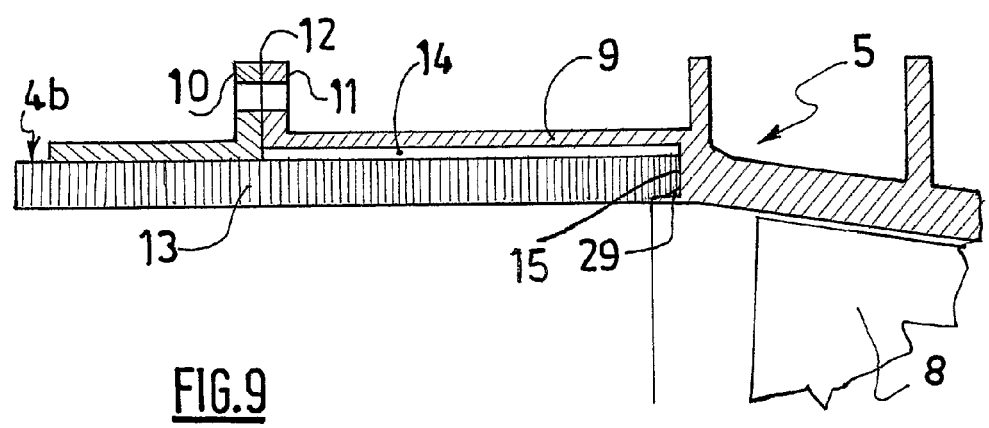

Alternatively and in a complementary manner, the casing 9 is fitted with at least one retention means of which two examples are shown in FIGS. 8 and 9.

As shown in FIG. 8, the casing 9 is fitted with a post 27 capable of interacting by complementarity of shape with a housing 28 arranged in the sound attenuation structure 13. This housing 28 may be fitted to the sound attenuation structure 13 or incorporated into the latter.

As shown in FIG. 9, the casing 9 is fitted with a complete or partial binding strip 29, advantageously positioned on the inner periphery of the casing 9 close to the join with the sound attenuation structure 13 in the proximity of the fan 6 and capable of supporting the sound attenuation structure 13. A shape, for example like a bevel, as a centering aid, may if necessary be made in the sound attenuation structure 13.

Although the invention has been described with reference to particular exemplary embodiments, it is very evident that it is in no way limited thereto and that it includes all the technical equivalents of the means described and their combinations if the latter are included in the context of the invention.

The invention claimed is:

1. A nacelle for a turbojet comprising an air intake structure capable of channeling a flow of air toward a fan of the turbojet and a middle structure comprising a casing designed to surround said fan and to which the air intake structure is attached, an inner peripheral surface fixed to a sound attenuation structure, the sound attenuation structure extending downstream beyond the air intake structure with no geometric break, the sound attenuation structure extending over at least a portion of the casing, wherein a space is arranged between a top surface of the sound attenuation structure and the at least a portion of the casing, wherein the portion of the sound attenuation structure extending downstream beyond the air intake structure is not supported by the air intake structure.

2. The nacelle as claimed in claim 1, wherein the sound attenuation structure comprises at least one structural reinforcement means.

3. The nacelle as claimed in claim 2, wherein the structural reinforcement means comprise a sheath, fitted or incorporated into the sound attenuation structure.

4. A nacelle for a turbojet comprising an air intake structure capable of channeling a flow of air toward a fan of the turbojet and a middle structure comprising a casing designed to surround said fan and to which the air intake structure is attached, the latter having an inner peripheral surface at least partially fitted with a sound attenuation structure extending with no geometric break over at least a portion of the casing, wherein a space is arranged between the sound attenuation structure and the casing and wherein the sheath has, at the casing, a thickness that decreases in the direction of the fan.

5. The nacelle as claimed in claim 1, wherein the sound attenuation structure is associated, at the casing, with at least one vibration-damping means.

6. The nacelle as claimed in claim 5, wherein the at least one vibration damping means comprise at least one abutment system mounted on the casing and capable of preventing the sound attenuation structure from moving.

7. The nacelle as claimed in claim 5, wherein the at least one vibration damping means comprise at least one elastic member mounted against the sound attenuation structure.

8. The nacelle as claimed in claim 6, wherein the at least one vibration damping means are capable of coming into contact with the sound attenuation structure by means of at least one flexible stop.

9. The nacelle as claimed in claim 1, wherein the sound attenuation structure has a downstream end capable of interacting with at least one complementary retention means fixedly attached to the casing.

10. The nacelle as claimed in claim 9, wherein the complementary retention means comprises at least one post capable of interacting with at least one corresponding housing fitted or arranged in the downstream end of the sound attenuation structure.

11. The nacelle as claimed in claim 9, wherein the casing has at least one binding strip capable of supporting the sound attenuation structure at its downstream end.

* * * * *